March 17, 1953
R. P. TRAINER ET AL
2,631,927
APPARATUS FOR REMOVAL OF CARBONACEOUS
DEPOSITS FROM POWDERED SOLIDS
Filed Feb. 28, 1950
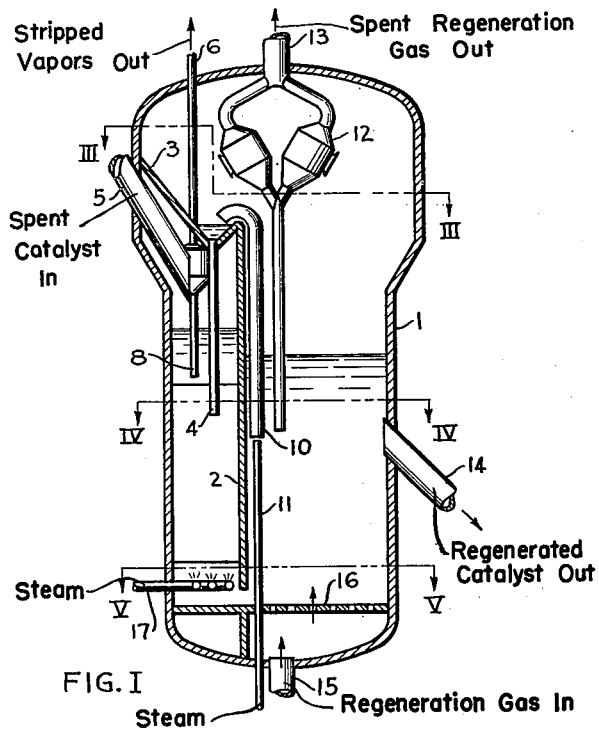
FIG. I
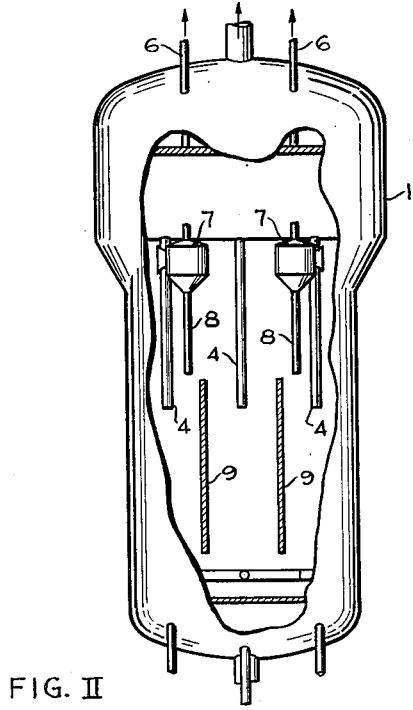
FIG. II
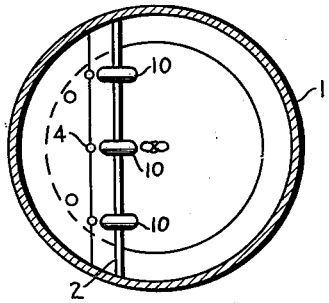
FIG. III
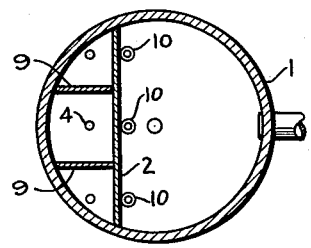
FIG. IV
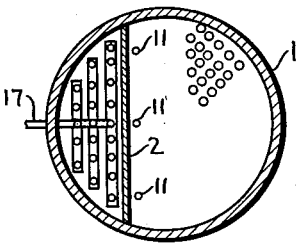
FIG. V
INVENTORS:
RICHARD P. TRAINER
LAWSON E. BORDER
BY: C. J. Ott
THEIR ATTORNEY Patented Mar. 17, 1953

2,631,927

UNITED STATES PATENT OFFICE 2,631,927

APPARATUS FOR REMOVAL OF CARBONACEOUS DEPOSITS FROM POWDERED SOLIDS

Richard P. Trainer, Amityville, N. Y., and Lawson E. Border, Westwood, N. J., assignors to Shell Development Company, San Francisco, Calif., a corporation of Delaware Application February 28, 1950, Serial No. 146,669

3 Claims. (Cl. 23—288)

1

This invention relates to an improved method and apparatus for the removal of carbonaceous deposits from powdered solids by stripping and burning.

An object of the invention is to provide a method and apparatus for the regeneration of various solids by stripping and burning which method and apparatus allow the regeneration to be carried out with a minimum pumping and a minimum consumption of compressed air for burning. A further object of the invention is to provide a method and apparatus which allow the stripping to be improved at little expense. These and other advantages of the process and apparatus will be apparent in the following description.

In many processes where non-combustible solids such as decolorizing clays, filter aids, catalysts and the like, are contacted with an oil or other carbonaceous liquid or vapor the solid becomes contaminated with carbonaceous material which impairs its effectiveness. It is therefore the practice to periodically remove the carbonaceous contaminants by a so-called regeneration treatment. While other regeneration methods are applicable in some cases, the most common method for regenerating the solid is to remove the major part of the more easily removable contaminants by a so-called stripping treatment and then to remove the remaining contaminants by burning under controlled conditions. The method of our invention is of this type.

In the regeneration of such contaminated solids the so-called fluidized solid technique is advantageously employed. In this method the solid in powder form (i. e., pieces of about 1 mm. or less diameter) is maintained in the pseudo liquid state by controlled aeration with a gas or vapor during the treatment (see U. S. 2,357,901). This technique which is widely used for regenerating such solids, allows better temperature control and allows the whole operation to be carried continuously with a minimum of equipment. In the process of our invention the fluidized solid technique is used.

The apparatuses for the regeneration of such solids using the fluidized powder technique fall into two distinct types. In the early stages of the development so-called top-draw-off vessels were used. In these, the powdered solid is withdrawn overhead as a dilute suspension in the aeration gas. In later designs so-called bottom-draw-off vessels are used. In these the powdered solid is withdrawn downwardly as a pseudo liquid from any point in the fluidized bed. The downflow type of operation has certain advantages.

2

(See Oil and Gas Journal, 43, 64, March 3, 1945.) In the process of our invention a downflow type of regenerator is used.

The apparatus of the invention will be described with reference to the attached drawing wherein Figure I is an elevation in section of one suitable form of apparatus. Figure II is a partly cut-away elevational view of the same apparatus rotated 90° from the position in Figure I. Figures III, IV and V are sectional views taken through the plane III—III, IV—IV, and V—V, respectively.

Referring to the drawing the apparatus comprises a cylindrical vessel or outer shell 1. The bottom closure may be elliptical as shown or may be of any other desired shape. The upper section is preferably swaged to a larger diameter as shown. The vessel is divided into two sections, hereinafter referred to as the stripping section and the burning section, by a vertical partition 2 which extends to a point near to but short of the bottom. The stripping section, which is to the left of the partition in Figure I, is sealed from the burning section at the top by a trough 3. At least one open-ended pipe 4 extends from the bottom of the trough down into the stripping section to a point below the normal level of the fluidized bed of solid. The inlet line 5 for the solid to be treated enters the stripping section below the trough. Vents 6 for stripped products pass from the upper part of the stripping section through the trough and out of the top of the vessel. These vents are preferably equipped with cyclone separators 7 having dip legs 8 extending down into the fluidized bed. The stripping section is also preferably divided up into cells by partitions 9, but this is not essential. In the apparatus illustrated the partitions 9 extend up only part way to points below the normal level of the fluidized bed. To the right of the partition 2, i. e., in the burning section, conduits 10 extend from a point below the normal level of the fluidized bed to a point over the partition 2. These conduits are arranged to discharge into the trough. Conduits 11, entering through the bottom are arranged to discharge gas into the lower ends of conduits 10. The apparatus is also provided with the conventional cyclone separators 12, flue gas discharge line 13, outlet for regenerated solid 14, inlet for regeneration gas 15, gas distributing grid 16, and a stripping gas distributing manifold 17.

The apparatus operates as follows. The contaminated solid is introduced into the stripping section via line 5. The powdered solid is maintained as a fluidized (pseudo liquid) bed having an upper level about as indicated. The fluidized solid passes downwardly in the stripping section countercurrent to stripping steam introduced by the distributing manifold 17. The stripped powder then, passes under the partition 2 into the burning section. After burning the remaining carbonaceous contaminants with air introduced via line 15 the regenerated solid is withdrawn via line 14. A portion of air or other gas is introduced through lines 11 and 10. This gas picks up fluidized solid and transports it by the air lift principle into the trough 3. The gas used for transport and the flue gas pass out of the vessel through cyclone separators 12 and line 13. The stripping steam and the stripped material pass out of the stripping section via cyclone separators 7 and lines 6. The stripped product may then be separately recovered. The fluidized solid discharged into the trough 3 passes via lines 4 into the stripping section. Due to the heat exchange relationship of the stripping zone and the burning zone and to the intermixing of the hotter particles introduced via the trough and lines 4, the temperature in the stripping section is increased. At the same time the fluidized powder in the trough seals the stripping section and allows the stripped products to be separately recovered.

In the regeneration of such solids using the fluidized solid technique the stripping of the solid prior to the burning is usually carried out in a section of the contacting vessel. In some cases, however, it is carried out in a separate vessel. Stripping in the contacting vessel is not usually very efficient. Stripping in a separate stripping vessel is more efficient but requires a more costly plant. It will be seen that in the process of the present invention the stripping is carried out more advantageously in a section of the regenerator.

In the application of the fluidized solid technique the height above the ground level at which the various vessels must be placed is an important consideration. It is usually desired to minimize the "pumping" of the fluidized solid; consequently, it is the practice to place one vessel at a higher elevation than the other so that gravity flow can replace one of the pumping operations. Generally the stripping vessel is placed higher than the burning vessel so that the heavier burning vessel may be placed at a low level and the stripped solid may flow downwardly into it. In some cases, it has been necessary to place the burning vessel above the stripping vessel. This, however, requires placing the heavier burning vessel at a considerable elevation and pumping the stripped solid to it. In the process of the present invention the stripping section and the burning section are at substantially the same small elevation. In our method the necessary flows are obtained with a minimum pumping, as well as equipment.

Summarizing the above it will be seen that in the present method and apparatus the stripping and burning are carried out in separate sections of the regenerator and at substantially the same elevation thereby reducing the cost of transporting the solid to a negligible amount. Also, the stripping zone and burning zone are in indirect heat exchange relationship through the dividing partition. Also, hot solid from the burning zone is cycled to the stripping zone. In consequence of the heat exchange through the partition and the cycling of hot solid the temperature in the stripping zone is increased. This in turn increases the efficiency of the stripping. Since the stripping is improved, the burning may be carried out faster without overheating and the amount of compressed air required to effect the burning is decreased. Also, the stripping gas containing valuable stripped products are separately collected, the intermixing of this product with the flue gas being prevented by a sealing bed of the solid. This sealing is effective and at the same time does not involve the hazards inherent with a full partition. The above-mentioned characteristics make the process and apparatus desirable from the standpoint of low initial cost, low operating cost, safety and efficiency.

We claim as our invention:

1. Apparatus for the regeneration of fluidized solids contaminated with carbonaceous deposits which comprises a vertically disposed vessel having top and bottom closures, an inlet for regeneration gas at the bottom, an outlet for spent regeneration gas at the top, an outlet for regenerated fluidized solid intermediate of said inlet and outlet for gases, a trough in the upper part of said vessel one side of which trough forms a substantially vapor tight seal with the wall of said vessel, at least one open-ended standpipe dependent from the bottom of said trough, a partition dependent from the other side of said trough to a point near to but short of the bottom of said vessel, said partition and trough dividing said vessel into a stripping zone below said trough and on one side of said partition and a burning zone on the other side of said partition, said partition extending all the way across the regenerator to seal the stripping zone from the burning zone at all points except the passage below the bottom of the partition, an inlet line for introducing finely divided solid to be regenerated near the top of said stripping zone below said trough, an outlet for the separate withdrawal of stripped vapors in the upper part of said stripping zone below said trough, an open-ended conduit extending from a point in said burning zone to a more elevated point in said trough, means for injecting a gas into the lower end of said conduit, an inlet for stripping gas in said stripping zone near the bottom of said dependent partition, and means near the bottom of said vessel for distributing said regeneration gas over the cross section of the burning section of said vessel.

2. A regenerator of the bottom draw-off type for regenerating contaminated fluidized solids, said regenerator being characterized by a vertical partition extending across said regenerator from wall to wall from points short of the top thereof and short of the bottom thereof and between an inlet for the introduction of the solid to be regenerated, and an outlet for the removal of the regenerated solid, a trough in the upper part of the regenerator sealing the vessel from the wall thereof on one side to the top of said partition, at least one open-ended standpipe extending downwardly from the bottom of said trough, an open-ended conduit passing over said partition having its upper end facing said trough and having its lower end on the side of the partition facing said outlet for regenerated solid, means for injecting gas into the lower open end of said conduit and means for injecting a stripping gas on the opposite side of said partition below said trough.

3. A bottom draw-off type regenerator for the regeneration of contaminated fluidized solids comprising a cylindrical shell provided with top and bottom closures, an inlet at the bottom adapted for the introduction of regeneration gas, a regeneration gas distributing means near the bottom adapted to distribute the regeneration gas over the cross-section of a burning zone, an outlet at the top adapted for the withdrawal of spent regeneration gas, a second outlet adapted for the withdrawal of the regenerated powder in a fluidized state located intermediate first outlet and said gas distributing means, and an inlet adapted for the introduction of fluidized powder to be regenerated, said regenerator being characterized by being likewise provided with a trough-like member in the upper section thereof forming a substantially vapor tight seal on one side only thereof with the wall of said cylindrical shell, a partition member depending from the opposite side of said trough-like member and extending down to a point near but above the bottom closure, said partition extending all the way across the regenerator to seal the stripping zone from the burning zone at all points except the passage below the bottom of the partition, a plurality of open-ended conduits depending from the bottom of said trough, separate gas distributing means in the lower part of said regenerator adapted to distribute stripping vapors only on the side of said partition below said trough, an open-ended conduit passing from said trough over said vertical partition and then downward to a point approximately even with said outlet for the removal of regenerated powder, and a separate outlet under said trough adapted for the separate removal of stripped vapors, said inlet for the introduction of fluidized powder to the regenerator being located immediately below said trough and on the opposite side of said partition from said outlet for withdrawal of regenerated powder.

RICHARD P. TRAINER.
LAWSON E. BORDER.

REFERENCES CITED

The following references are of record in the file of this patent:

UNITED STATES PATENTS

| Number | Name | Date |
|---|---|---|
| 2,304,128 | Thomas | Dec. 8, 1942 |
| 2,409,234 | Arveson | Oct. 15, 1946 |
| 2,432,298 | Eastwood et al. | Dec. 9, 1947 |
| 2,450,753 | Guyer | Oct. 5, 1948 |
| 2,451,619 | Hengstebeck et al. | Oct. 19, 1948 |
| 2,457,232 | Hengstebeck | Dec. 28, 1948 |
| 2,480,887 | Strader | Sept. 6, 1949 |
| 2,490,986 | Symonds | Dec. 13, 1949 |
| 2,526,881 | Kunreuther et al. | Oct. 24, 1950 |
| 2,571,380 | Penick | Oct. 16, 1951 |
| 2,580,827 | Payne | Jan. 1, 1952 |